United States Patent [19]

Caroff

[11] 4,432,145
[45] Feb. 21, 1984

[54] APPARATUS FOR INSPECTING THE GEOMETRY OF THE WHEELS OF A VEHICLE

[75] Inventor: Yves Caroff, Saint Mande, France
[73] Assignee: Facom, Morangis, France
[21] Appl. No.: 323,255
[22] Filed: Nov. 20, 1981
[30] Foreign Application Priority Data Nov. 21, 1980 [FR] France ................................ 80 24762

[51] Int. Cl.$^3$ .......................................... G01B 11/275
[52] U.S. Cl. .................................... 33/288; 33/203.18; 33/336; 356/155
[58] Field of Search ..................... 33/288, 203.18, 336; 356/154, 155

[56] References Cited

U.S. PATENT DOCUMENTS

| 3,337,961 | 8/1967 | Holub | 33/203.18 X |
| 4,095,902 | 6/1978 | Florer et al. | 356/155 |
| 4,097,157 | 6/1978 | Lill | 33/288 |
| 4,130,362 | 12/1978 | Lill et al. | 33/288 |
| 4,311,386 | 1/1982 | Coetsier | 33/288 |

Primary Examiner—William D. Martin, Jr.
Attorney, Agent, or Firm—Murray Schaffer

[57] ABSTRACT

This apparatus comprises, in combination, two similar devices disposed in opposite directions. The devices are adapted to be fixed respectively to the two opposite wheels of a vehicle and parallel to the latter. Each device comprises a first rigid hollow tubular bar and a fixing structure for fixing the bar to a projector carrier. A structure inside the bar projects a beam of light longitudinally inside the bar. The beam is reflected at one end of the bar by a mirror which is rigid with a screen and so disposed as to project the beam transversely toward the screen pertaining to the opposite device. The mirror is mounted on the first bar of at least one of the devices so as to be movable toward or away from the fixing structure. A structure for receiving a sub-assembly for inspecting the pivot and castor angles of the vehicle wheel is provided. An apparatus for measuring the camber angle of the vehicle wheel is also provided.

9 Claims, 5 Drawing Figures

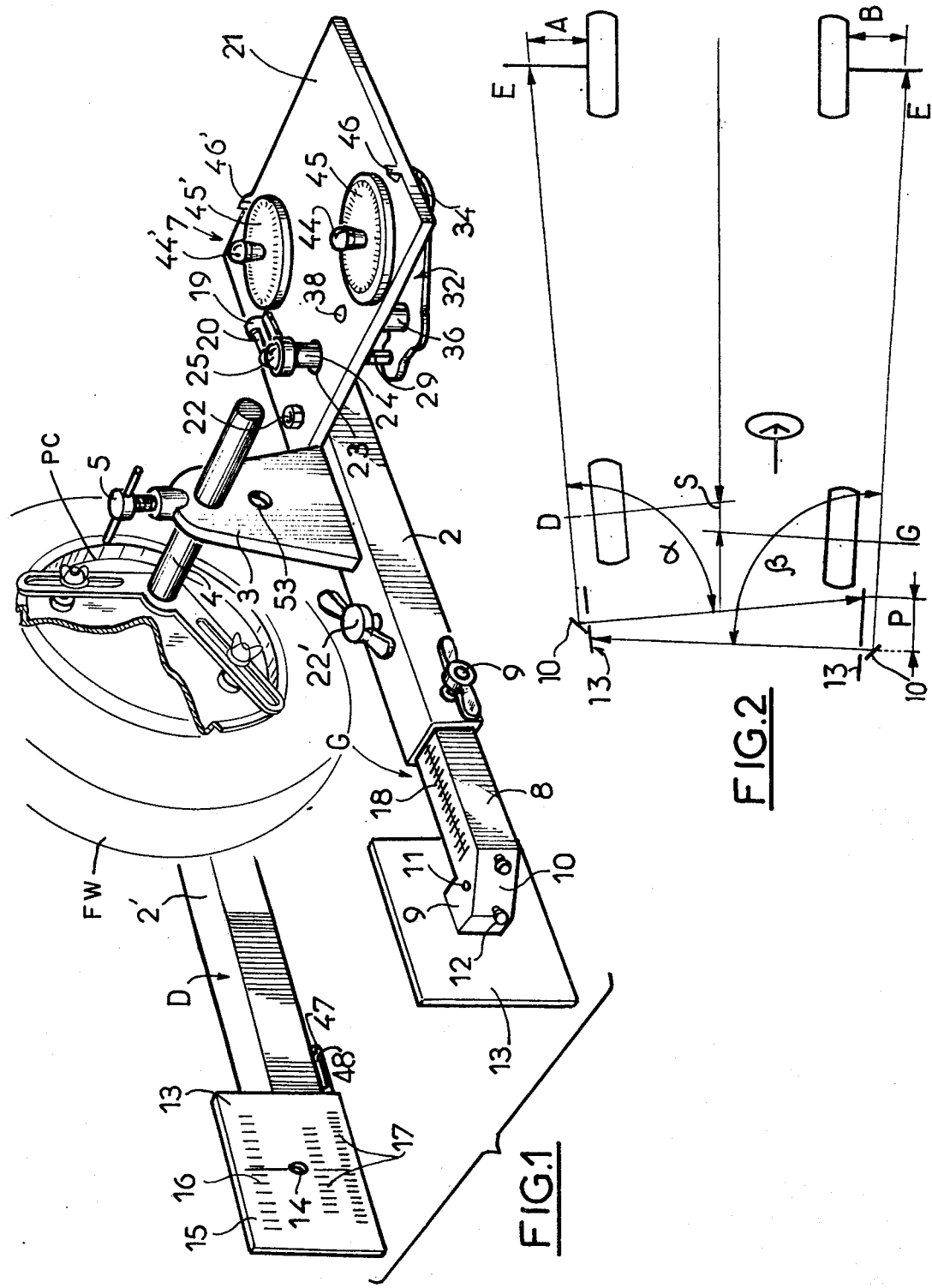

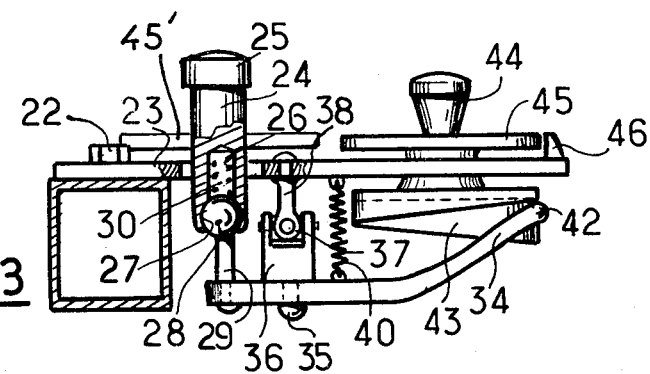
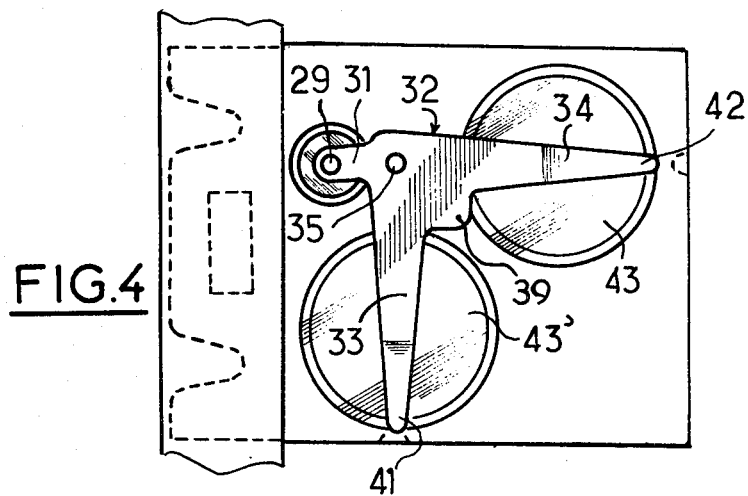
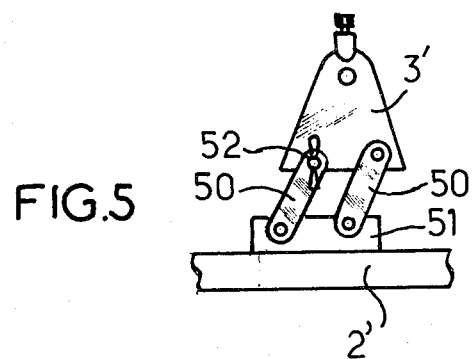

APPARATUS FOR INSPECTING THE GEOMETRY OF THE WHEELS OF A VEHICLE

DESCRIPTION

The present invention relates to apparatus employed for the inspection and the adjustment of the wheels of a vehicle, the alignment of the front and rear axles, the parallelism, and the castor angle and the kingpin inclination of the front wheels.

One of the most commonly employed systems for inspecting the geometry of the wheels of a vehicle employs the principle of the projection on a fixed screen of a beam of light which is emitted by a source mounted in a given position on the wheels of a vehicle.

A source of light, mounted on each of the front wheels of a vehicle, for example by means of a conventional projector carrier of the type employed for inspecting the ways of wheels, projects a beam of light transversely on a screen carried by the other wheels and the differences observed between the points of impact on the respective screens of the beams coming from each source provide elements from which a technician may calculate the value of the corrections to be effected.

However, these indications are affected by many factors which complicate the calculations and are sources of error.

Indeed, the projector carriers employed, which are of the type employed for inspecting the ways of wheels, are difficult to center concentrically with the stub-axle of the wheel and this introduces a first factor of error. Further, the rims very often have on their edges a slight defect in the centering and the stub-axles of the two sides of the vehicle are not necessarily exactly in their theoretical geometric position.

The left and right rear stub-axles are not located always at their theoretical position and on some vehicles the axes of the rear left and right wheels may furthermore have a certain longitudinal offset, normally termed set-back.

It will be understood that there various defects and characteristics should be taken into account in the calculation of the values of the corrections which must be effected.

Moreover, the apparatus employed in workshops are often subjected to shocks which are liable to deform them and the initial inspection or calibration of the apparatus requires special cumbersome tooling and is long and consequently costly.

There is known an apparatus disclosed in French Patent No. 852 617, which is employed for measuring the toe-in, the camber and the castor and the kingpin inclination of the wheels of a vehicle. This apparatus comprises two frames each of which comprises an elongated support bar provided with feet and adapted to be placed on the ground parallel to the front wheels and against the latter.

A unit comprising a source of light and a graduated table is movably mounted along one of said support bars whereas a mirror for returning the beam of the projector is movably mounted along the other support bar.

This apparatus is inaccurate, first of all owing to the fact that the support frames are only placed on the ground and against the wheels without any fixing and also owing to the fact that it takes no account of the alignment on the rear wheels. Further, it requires many different accessory devices and only provides overall indications of no value since they do not take into account the alignment.

A more precise apparatus is also known which is disclosed in French patent application No. 2 429 413 and comprises two arms mounted on the front wheels by means of adjustable devices of the projector carrier type and each having internally a source of light which emits a beam which is returned at a right angle by means of a orientable mirror transversely of the axis of the vehicle, the position of the mirror being controlled by a graduated drum.

A reference is carried on each arm in the vicinity of the mirror.

Like the preceding apparatus, this apparatus does not take into account the alignment on the rear wheels. Further, it only furnishes an overall indication of angular value and this necessitates an algebraic calculation with auxiliary graduated drums.

Another apparatus is disclosed in French patent application No. 2 347 654 and comprises mechanical means, associated with optical means involving a direct optical viewing and with electronic means giving an electric measurement of an angular position of a flexible cable.

Although it takes into account the alignment, this apparatus is complicated, costly, fragile and inaccurate in particular owing to the ocular viewing and the fexibility of the cable.

It is also known in the art to employ the same source of light for emitting not only the beam reflected transversely in the front but also a beam directed toward the rear on a screen rigid with the rear wheels so as to verify the alignment.

As concerns the inspection of the castor angle and the kingpin inclination, the most commonly employed system uses an apparatus which is also fixed on a projector carrier concentrically with the stub-axle of the wheel the geometry of which is desired to be inspected, this apparatus comprising an articulated level carrying an adjustable spirit level. With the wheel turned through a certain steering angle, the spirit level is adjusted to a horizontal position and, after having turned the wheel through an equal angle in the opposite direction, the spirit level is brought to the same position by means of a cam mechanism which acts on the articulated lever, this mechanism comprising a control knob and a graduated scale on which can be read the value of the correction which must be effected.

It is known that in order to carry out a precise inspection of the geometry of the front set of wheels of a vehicle, it is necessary not only to carry out the inspection of the parallelism but also the inspection of the, castor and camber angles and of the kingpin inclination. With the existing apparatus, these different measurements must be carried out in a plurality of operations with separate apparatus, and there consequently exists a danger of omission or negligence. Further, the necessary calculations of the values of correction, at least as concerns the parallelism, require either that the operations be effected by a very qualified personnel or that the operator consult such personnel so that this personnel can carry out the calculation if his knowledge does not enable him to do so himself.

An object of the invention is to overcome these drawbacks and to provide a single apparatus for the inspection of the geometry of the wheels of a vehicle, and in particular of the front set of wheels, which first of all furnishes a direct reading of the values of corrections to be effected after compensation for the various factors of errors and, secondly, which may be gauged without requiring an auxiliary apparatus and, thirdly, which permits carrying out all the operations for inspection and adjustment on the wheels of a vehicle without changing the apparatus.

The invention therefore provides an apparatus for inspecting the geometry of the wheels of a vehicle, of the type comprising, in combination, two symmetrically designed devices adapted to be fixed respectively on two opposed front wheels of a vehicle, parallel to said wheels, and each comprising a first hollow tubular rigid bar including means for fixing it to a projector carrier, means inside the bar for longitudinally projecting a beam of light, said beam being reflected at one end of the bar by a mirror rigid with a screen and disposed in such manner as to project said beam transversely toward a screen carried by the opposite device, wherein on at least one of said devices, the mirror-screen unit is mounted at one end of a second tubular bar whose other end is engaged in such manner as to slide telescopically in said first bar so as to be movable toward and away from said fixing means, and it comprises, on each device, means adapted to receive a sub-assembly for inspecting the castor angle and the kingpin inclination.

According to another feature of the invention, on each device the mirror is slidably mounted relative to said fixing means.

According to a preferred embodiment of the invention, the mirror is fixed at one end of a hollow element having open ends and mounted telescopically slidable in one end of said bar.

According to another embodiment, said bar is articulated to said fixing means in such manner as to be pivotable in a plane parallel to the wheel on which the device is fixed.

Advantageously, the bar is articulated to the fixing means by a deformable parallelogram structure.

Further features and advantages of the invention will be apparent from the ensuing description with reference to the accompanying drawings which are given merely by way of example and in which:

FIG. 1 is a perspective view of two measuring devices according to the invention for inspecting the geometry of the wheels of a vehicle comprising a sub-assembly for inspecting castor, angle and kingpin inclination, one of the devices being shown partly;

FIG. 2 is a diagram showing the use of the apparatus for inspecting the alignment of the front and rear wheels and the parallelism;

FIG. 3 is a side elevational view of a sub-assembly which is a part of the device shown in FIG. 1 for simultaneously inspecting the and the kingpin inclination;

FIG. 4 is a bottom plan view showing the arrangement of the L-shaped lever of the mechanism of the sub-assembly shown in FIG. 4;

FIG. 5 is a partial view of a modification of the lever for adjusting the mirror longitudinally along the bar relative to the fixing point on the wheel.

In the embodiment shown in FIG. 1, the apparatus according to the invention comprises two generally symmetrically designed measuring devices adapted to be mounted respectively on each side of a vehicle, namely a right device D and a left device G, only the left device of which is shown fully in the drawings, the right device D being shown only partly in order to show its different parts.

The measuring device generally designated by the reference character G comprises in the known manner a hollow tubular rigid bar 2 which, in the presently-described embodiment, is of square section and has on one of its sides a support bracket 3 by means of which the bar 2 may be suspended from a carrier PC which may be a projector carrier of known type and shown (for example in FR-A-No. 2,128,233) by means of a rod 4 which is disposed perpendicular to the bracket and is slidably mounted in an aperture formed adjacent the end of the bracket, it being possible to lock the latter on the rod 4 by means of a set screw 5. Of course, in the instant apparatus, carrier PC is not used for carrying a projector as is usual in the prior art, but rather the suspension of a respective measuring device G or D.

The bar 2 comprises internally in the known manner a source of light SL having an optical device including lenses (not shown) adapted to project a beam of light in opposite longitudinal directions of the bar 2, this beam being capable of issuing from the bar by way of the two ends of the latter.

In apparatuses of known type, a mirror is fixed at one of the ends of the bar and is disposed at 45° relative to the axis of the beam of light so as to reflect this beam transversely. Further, a screen is adapted to be fixed adjacent to the mirror.

According to the invention, devices G and D each comprise a hollow tubular bar 8 having suitable shape and dimensions to enable it to be telescopically and slidably mounted inside the bar 2 in which it may be locked in any longitudinal position, for example by means of a set screw 8A.

At its outer end, the bar 8 has a hollow elbow 9 whose corner is truncated at 45° and carries a mirror 10 which is mounted on a vertical pivot pin 11 and is adjustable by means of screws 12.

By means of this arrangement, the beam of light emitted inside the bar 2 along the axis of the latter is reflected by the mirror 10, which is inclined at roughly 45°, and issues from the bar laterally and perpendicularly to its initial path.

The elbow 9 carries at the open end thereof a plate 13 which is provided with a centre aperture 14 located in such manner as to coincide with the light ray reflected by the mirror 10, the plate 13 carrying a screen 15 which is fixed thereon and on which there is provided a graduated scale 16, 17, for example in millimeters, or degrees of an angle, or both, these graduations extending longitudinally on each side of a common origin O which coincides with the aperture 14.

Advantageously, the bar 8 may carry on the upper side thereof a graduation 18 for the purpose which will be explained hereinafter.

The device described hereinbefore and shown in FIG. 1 comprises, fixed thereon, a sub-assembly 7 which is adapted to effect an operation for inspecting the castor angle and the kingpin inclination which is complementary to the operation of the inspection of the parallelism effected by means of the light beams and the screens 15.

The sub-assembly 7, fixed in the vicinity of the opposite end of the bar 2, comprises a support plate 21 fixed to the upper wall of the bar 2, for example by means of screws 22 (only one of which has been shown in the drawings) so as to extend horizontally when the device is fixed on a projector carrier mounted on a vehicle wheel, roughly perpendicularly to the axis of the bar 2.

A first spirit level 19 is fixed on the plate 21 parallel to the axis of the bar 2, its bubble being visible by way of an upper opening 20.

The plate 21 includes an aperture 23 through which extends roughly vertically an arm 24 which carries at its upper end a spherical spirit level 25.

The respective diameters of the aperture 23 and the arm 24 are adapted to define therebetween a large clearance for a purpose which will be clear hereinafter.

The end of the arm 24 opposed to the spirit level 25 comprises a blind bore 26 whose end is counterbored in such manner as to have a semi-spherical shape as shown at 27 for the purpose of receiving and surrounding a ball 28 which is rigid with a rod 29, a spring 30 being disposed in the bore 26 in accordance with a conventional arrangement so as to maintain the arm 24 in position by the effect of friction on the ball 28.

The rod 29 of the ball 28 is fixed, for example screwed, riveted or welded to a tab 31 rigid with an L-shaped lever 32 having two branches 33, 34 respectively whose axes define therebetween a right angle at the apex 35, the tab 31 being preferably adjacent to said apex.

The lever 32 is fixed to the lower side of the plate 21 by means of a universal joint which has one fork member 36 fixed to the apex 35 of the lever and another fork member 38 fixed to the plate 21.

Advantageously, an enlarged part 39 of the lever 32, located between the inner edges of the branches 33 and 35, is connected to the lower side of the plate 21 at a point which is preferably located on the bisector of the angle defined by the branches of the lever 32, by means of a spring 40 which is under tension so as to bias the branches of the lever toward the plate 21.

The ends 41, 42 of the branches of the lever 32 are curved toward the plate 21, as shown in FIG. 3, and constitute cam followers each of which are in contact with the helical camber of a cam 43, 43' rotatably mounted below the plate 21 on a shaft which extends through the latter and carries at its opposite end a control knob 41, 41' rigid with a graduated circular plate 45, 45' adapted to rotate in front of a fixed reference or index 46, 46' rigid with the plate 21.

The device comprising a cam 43, 43' and a control knob with a graduated plate is known per se and employed in conventional apparatus.

The apparatus according to the invention operates in the following manner:

With the wheels of the vehicle mounted on graduated rotating plates devices G and D according to the invention are fixed respectively on projector carriers PC mounted on each of the front wheels FW of a vehicle, and the usual operations for inspecting the alignment by means of the beam of light projected toward the rear wheels on a screen E fixed in the vicinity of each of these wheels (FIG. 2) are carried out.

The projection of the transverse beam of light is employed, as in the devices of the prior art, for inspecting and adjusting the parallelism.

However, owing to the mounting of the screens 15 on the bars 8 slidably mounted in the bars 2, it is then possible to displace the mirrors 10 and consequently the point of arrival of the transverse beam of light emitted by each device on the opposite screen, by moving it away from or toward the fixed point constituted by the fixing on the wheels. It is then possible to display and read directly on one of the screens the overall value of the parallelism and consequently of the corrections to be effected.

Indeed, after having effected the alignment with the rear wheels, it is possible to compensate for the longitudianl set back, designated by S in FIG. 2, between the wheels by a longitudinal displacement of the mirror and of the screen on the left side so as to bring the projection of light coming from this left device G onto the graduation O of the screen of the right device D.

In this way there is displayed on the left screen, owing to this longitudinal displacement, the overall value P of the parallelism whereas the alignment with the rear wheels is not modified.

Further, owing to the alignment, each front wheel then has the same toe-in or toe-out angle, ie. on each wheel one half of the overall value displayed on the left screen, namely ½ P.

Consequently, in order to obtain a direct reading of the value of the parallelism wheel by wheel, without necessity to effect a calculation, it is sufficient to displace the screen of the left device G until the moment when there is obtained the same displayed value on the two screens: ±½ P. Thus personnel having no particular technical qualificationb may carry out this method, since a calculation is avoided.

However, the initial alignment on the screens E of the rear wheels, which constitutes a stage in this operation, is not always sufficient since on many vehicles there is a steering reference or index which must be respected and this requires a re-alignment.

After this re-alignment, the equal left and right values which were displayed on the transverse rear screen are then different, but their sum remains unchanged. In this way, there is obtained a value of the parallelism wheel by wheel as a function of the steering reference of the constructor.

In this position it is easy to adjust each wheel in succession in following, in the course of the operation, the displacement of the point of arrival of the beam of light on the screen opposite the wheel in the course of adjustment, until one half of the value of the overall parallelism indicated by the constructor is displayed.

After this adjustment, the values displayed on the rear screens E are different from the initial values but will be equal. It can be seen that, consequently, the centering of the steering and the adjustment of the parallelism are obtained simultaneously with no calculation or hesitation by means of the apparatus according to the invention.

It is of course necessary that the bars of the devices on each wheel be both as near as possible to the horizontal. Consequently, in order to proceed to this adjustment of the devices, the spirit level 20 provided on the sub-assembly 7 will be used, this spirit level being also used previously in the course of the inspection carried out by means of this sub-assembly.

In order to complete the operation for inspecting the geometry of the front set of wheels, it is then essential to effect an inspection of the castor and the kingpin inclination which may be carried out in the course of the same operation by means of the sub-assembly 7.

After having previously checked, by means of the spirit level 20, that the device is horizontal when the steering angle is zero, the left wheel is turned toward the left, for example through 20°, and the two graduated discs 45, 45' are oriented with their graduations in front of the corresponding fixed index or reference 46 or 46'.

The second spirit level 25 is then oriented manually by making it pivot about the ball 28 owing to the clearance provided between the rod 24 and the edge of the aperture 23 in the plate 21, until the bubble of the spirit level 25 is exactly centered.

The steering is then straightened and the wheels are steered or turned toward the right through the same angle 20° and, owing to the swinging movement of the examined wheel which results, the bubble of the spirit level 25 is no longer centered. The two control knobs 44, 44' are then rotated, each of which acts on one of the two branches 33, 34 of the lever 32, each of the cam devices shifting the associated lever arm in a plane making a right angle with the plane in which the other lever moves. In combining the action of the two cam devices, the bubble of the spirit level 25 is then re-centered. It is then possible to read directly on the graduated discs 45 and 45' the values of the castor angle and kingpin inclination, obtained simultaneously. Consequently, it is impossible to measure only one of the two angles, which obliges the operator to effect a complete inspection and consequently to discover a defect which with conventional apparatus would have escaped his attention.

Note that a spirit level 47 is provided on the lower side of each bar 2 in the vicinity of its end in which the bar 8 slides, the spirit level 47 having a bubble visible on a lateral slot 48 facing toward the interior. This spirit level is of use when the vehicle is on a raisable platform and the operator is working under the latter. It then enables him to check that the devices are both horizontal while the spirit level 20 is then not easily accessible.

FIG. 5 shows a modification of the device according to the invention in which the displacement of the point of emission of the transverse beam of light relative to the fixing point of the device on the stub-axle of the wheel is ensured in a different way by means of two links 50 which are articulated at one end at spaced apart points to the ends of the lower part of the bracket 3'. The opposite ends of the links 50 are articulated at the same distance apart to a support 51 in such manner that these links are parallel, the support 51 being fixed to the upper part of the bar 2' and constituting a deformable parallelogram structure which enables the bar 2' to be shifted forwardly or rearwardly the required distance for most of the operations of inspection. The vary small variation in the height which results from this displacement has practically no effect on the precision of the reading obtained. A winged nut 52 enables the parallelogram structure constituted by the links 50 to be locked in any position of the bar 2'.

This arrangement also permits varying the height of the bar 2' relative to the axis of the wheel. If it is desired, there may be provided in the support brackets 3 of the embodiment shown in FIG. 1 one or more apertures, such as 53, in which the rod 4 may be disposed.

Note that it is possible to employ a graduation such as the graduation 18 carried by the slidable bar 8, for reading off the values of displacement of the mirror and of the screen relative to the edge of the end of the bar 2 and thus discovering an excessive "set-back" resulting from a deformation of the axle and not soley from a bad centering.

The graduation 18 permits measuring the set back. Beyond 10 mm, there is a defect in the alignment of the two stub-axles which are not located on the same transverse axis (axle).

This graduation thus provides a diagnostic for warning the operator who must seek the cause (for example deformation of the chassis owing to an impact thereon).

The neutralization of the set-back by sliding the bar 8 thus provides an interesting possibility as concerns the safety of the road-holding properties of the vehicle.

Advantageously, means may be provided for imparting to the projection of the transverse beam of light on the opposite screen a vertically elongated shape with a rectilinear edge. This shape permits the projection of the beam to cover the entire height of the graduations on the screen.

Note also that the sectional shape of the bars 2, 2', 8 may be different from the illustrated shape, for example circular, which permits an adjustment of the height of the projection of light on the screens.

It is clear from the foregoing that the invention provides an apparatus which avoids most of the drawbacks of the prior art by simple and cheap means which may be employed by a personnel having no particular qualification.

In one embodiment, which is also advantageous but not illustrated, the mirror-screen unit 10, 13 is movably mounted on each device either by means of a slidable bar as shown in FIG. 1, or by means of a parallelogram structure as shown in FIG. 5.

Another advantage of the invention resides in the fact that when the vehicle is on a raising platform, for example at a height of about 1.5 m, the operator may observe without moving both the front screens and both of the rear screens by placing himself approximately at 1 m in front and in the middle of the front axle and in looking in the direction of the vehicle.

From this position, the mirror-screen units are within his reach and the adjustment for inspecting the parallelism and the alignment are easy and rapid which results also from the mounting of the mirrors on telescopic parts.

After having carried out the measurements, the devices G and D may be inverted by mounting that of the front right wheel on the front left wheel and inversely with the mirror-screen units at the rear, which enables the operator to operate from the front without intercepting the transverse beam of light.

Having now described my invention what I claim as new and desire to secure by Letters Patent is:

1. An apparatus for inspecting the geometry of wheels of a vehicle, comprising, in combination, two measuring devices adapted to be fixed respectively to two front wheels of the vehicle and which, in use, have a generally symmetrical shape with respect to each other, each of said devices comprising in combination a first hollow tubular rigid bar, a projector carrier adapted to be mounted on one of said front wheels, means for fixing the bar to the projector carrier whereby said bar extends substantially parallel to said wheel, means inside the bar for projecting a beam of light longitudinally of the bar, a unit disposed at one of the bar and comprising a screen, a mirror rigid with the screen and disposed in such manner as to reflect said beam and project said beam transversally of the apparatus toward the screen pertaining to the opposite device of said two devices, said apparatus further comprising, on at least one of said devices, a second tubular bar having one end portion telescopically and slidably mounted in said first bar so that the second bar is movable toward and away from said fixing means, a locking means for arresting telescopic movement of said second bar in said first bar, said unit comprising the mirror and the screen being mounted on the second bar adjacent an end of the second bar opposed to said one end portion, whereby relative telescopic movement of said first and second bars allows for compensation of set-back of the rear wheels of said vehicle, the apparatus further comprising means on each of said devices for receiving a sub-assembly for inspecting the kingpin inclination and the castor angle of the vehicle wheels.

2. An apparatus according to claim 1, wherein on each of said devices the mirror is slidably mounted relative to said fixing means.

3. An apparatus according to claim 1, or 2, comprising, on each device, a hollow element having open ends and telescopically and slidably mounted in one end of said first bar, said mirror being fixed on the hollow element adjacent one end of the hollow element.

4. An apparatus according to claim 3, comprising articulation means for articulating said first bar to said fixing means in such manner that said first bar pivots in a plane parallel to the wheel on which wheel the device is fixed.

5. An apparatus according to claim 4, wherein said articulation means comprise links constituting a deformable parallelogram structure and means for locking the parallelogram structure in any configuration.

6. An apparatus according to claim 1 or 2, comprising a sub-assembly for inspecting the kingpin inclination castor angle of the vehicle wheels and fixed to said first bar by said means for receiving said sub-assembly.

7. An apparatus according to claim 6, wherein said sub-assembly comprises a support adapted to be fixed horizontally and perpendicularly to said first bar, a first spherical spirit level carried by said first bar, a second spirit level, an L-shaped lever having two branches and an apex, a universal joint connecting said apex to said support, a cam mechanism associated with the L-shaped lever for controlling the inclination of the L-shaped lever in two orthogonal planes, means connecting two opposed ends of said branches of the L-shaped lever to said cam mechanism, a ball joint articulating said second spirit level to said L-shaped lever, means associated with said mirror for shifting said mirror roughly parallel to the axis of said beam relative to a point at which the device is fixed on said projector carrier.

8. An apparatus according to claim 1, wherein said first hollow bar and said second hollow bar have a complementary circular cross-sectional shape.

9. An apparatus for inspecting the geometry of wheels of a vehicle, comprising, in combination, two measuring devices adapted to be fixed respectively to two front wheels of the vehicle and which, in use, have a generally symmetrical shape with respect to each other, each of said devices comprising in combination a first hollow tubular rigid bar, a projector carrier adapted to be mounted on one of said front wheels, means for fixing the bar to the projector carrier whereby said bar extends substantially parallel to said wheel, means inside the bar for projecting a beam of light longitudinally of the bar, a unit disposed at one of the bar and comprising a screen, a mirror rigid with the screen and disposed in such manner as to reflect said beam and project said beam transversally of the apparatus toward the screen pertaining to the opposite device of said two devices, said apparatus further comprising, on at least one of said devices, a second tubular bar having one end portion telescopically and slidably mounted in said first bar so that the second bar is movable toward and away from said fixing means, a locking means for arresting telescopic movement of said second bar in said first bar, said unit comprising the mirror and the screen being mounted on the second bar adjacent an end of the second bar opposed to said one end portion, whereby relative telescopic movement of said first and second bars allows for compensation of set-back of the rear wheels of said vehicle, the apparatus further comprising means on each of said devices for receiving a sub-assembly for inspecting the kingpin inclination and the castor angle of the vehicle wheels, said sub-assembly comprising a support adapted to be fixed horizontally and perpendicularly to said first bar, a first spherical spirit level carried by said first bar, a second spirit level, an L-shaped lever having two branches and an apex, a universal joint connection said apex to sad support, a cam mechanism associated with the L-shaped lever for controlling the inclination of the L-shaped lever in two orthogonal planes, means connecting two opposed ends of said branches of the L-shaped lever to said cam mechanism, a ball joint articulating said second spirit level to said L-shaped lever.

* * * * *